United States Patent
Lee (10) Patent No.: US 8,037,338 B2
(45) Date of Patent: Oct. 11, 2011

(54) DATA INTERFACE METHOD AND APPARATUS

(75) Inventor: Kyong Su Lee, Yongin-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 697 days.

(21) Appl. No.: 12/107,977

(22) Filed: Apr. 23, 2008

(65) Prior Publication Data

US 2008/0267267 A1    Oct. 30, 2008

(30) Foreign Application Priority Data

Apr. 30, 2007   (KR) .................. 10-2007-0041924

(51) Int. Cl.
*G06F 1/00* (2006.01)
*G06F 12/00* (2006.01)
*H04L 25/64* (2006.01)
*H04B 3/00* (2006.01)
*H04B 1/10* (2006.01)

(52) U.S. Cl. ........ 713/500; 710/240; 375/214; 375/257; 455/283

(58) Field of Classification Search .................. 710/240; 375/214, 257; 455/283; 713/500
See application file for complete search history.

(56) References Cited

U.S. PATENT DOCUMENTS

| | | | |
|---|---|---|---|
| 6,243,776 B1 | 6/2001 | Lattimore et al. | |
| 6,650,140 B2 * | 11/2003 | Lee et al. | 326/39 |
| 6,703,866 B1 | 3/2004 | Arimilli et al. | |
| 7,091,741 B2 | 8/2006 | Kim | |
| 7,092,472 B2 | 8/2006 | Stojanovic | |
| 7,269,699 B2 | 9/2007 | Jang | |
| 7,292,637 B2 * | 11/2007 | Ho et al. | 375/257 |
| 7,421,014 B2 * | 9/2008 | Kryzak et al. | 375/219 |
| 7,436,210 B2 * | 10/2008 | Venkata et al. | 326/38 |
| 7,466,787 B1 * | 12/2008 | Ross | 375/376 |
| 7,715,467 B1 * | 5/2010 | Burney | 375/219 |
| 2002/0078280 A1 | 6/2002 | Arimilli et al. | |
| 2006/0256909 A1 * | 11/2006 | On et al. | 375/376 |
| 2009/0232151 A1 * | 9/2009 | Furlong et al. | 370/419 |

FOREIGN PATENT DOCUMENTS

| | | |
|---|---|---|
| KR | 1020050003894 A | 1/2005 |
| KR | 1020050030293 A | 3/2005 |

* cited by examiner

*Primary Examiner* — Mark Rinehart
*Assistant Examiner* — Christopher A Daley
(74) *Attorney, Agent, or Firm* — Volentine & Whitt, PLLC (57) ABSTRACT

A data interface method includes differentially amplifying differential data signals based on a mode control signal indicating a first mode, transmitting the amplified differential data signals to a receiving semiconductor device via first and second transmission lines, and driving one of the differential data signals and a strobe signal to the first and second transmission lines, respectively, based on the mode control signal indicating a second mode, for transmitting the one of the differential data signals and the strobe signal to the receiving semiconductor device. The receiving semiconductor device samples the received differential data signals according to differential signaling, in response to a controlled sampling clock signal based on the mode control signal indicating a first mode; and samples the one of the differential data signals in response to a strobe signal, received from the transmitting semiconductor device, based on the mode control signal indicating a second mode.

12 Claims, 7 Drawing Sheets

DATA INTERFACE METHOD AND APPARATUS

CROSS-REFERENCE TO RELATED PATENT APPLICATION

A claim of priority is made to Korean Patent Application No. 10-2007-0041924, filed on Apr. 30, 2007, the subject matter of which is hereby incorporated by reference.

FIELD OF THE INVENTION

The present invention relates to a semiconductor device, and more particularly, to a data interface method and apparatus.

BACKGROUND OF THE INVENTION

In systems that include semiconductor memory devices, power consumed during data interface is proportional to a clock frequency used for the data interface. Accordingly, power consumed during a high-speed data interface is greater than that consumed during a low-speed data interface. Also, as the transmission rate of an input/output (I/O) interface increases, skew caused by different delays occurring in channels between the interfacing semiconductor devices also increases. Accordingly, per pin deskewing is necessary for pins corresponding to the respective channels in the semiconductor devices.

In order to compensate for skew, clock and data recovery (CDR) may be performed. In order to accomplish high-speed data transmission, differential signaling is more advantageous than single ended signaling, which is sensitive to supply noise, cross-talk and inter-symbol interface, for example. Generally, CDR and differential signaling may be used together for a high-speed data interface.

SUMMARY OF THE INVENTION

Embodiments of the present invention provide a method and apparatus for using differential signaling for high-speed data transmission and single ended signaling for low-speed data transmission, which reduces power consumption during data interfacing.

According to embodiments of the present invention, there is provided a semiconductor device including a signal switch and a signal amplifier. The signal switch is configured to receive differential data signals and a strobe signal, and to output either the differential data signals or one of the differential data signals and the strobe signal, based on a mode control signal. The signal amplifier is configured to differentially amplify the differential data signals output from the signal switch or to individually amplify the one of the differential data signals and the strobe signal output from the signal switch, and to transmit the amplified signals to a receiving semiconductor device via multiple transmission lines.

According to other embodiments of the present invention, there is provided a semiconductor device including a sampler and a clock and data recovery (CDR) unit. The sampler is configured to sample differential data signals that are transmitted from a transmitting semiconductor device in response to a controlled sampling clock signal based on a mode control signal, or to sample one of the differential data signals that is received from the transmitting semiconductor device in response to a strobe signal received from the transmitting semiconductor device based on the mode control signal. The CDR unit is configured to generate the controlled sampling clock signal from the differential data signals based on the mode control signal.

According to other embodiments of the present invention, a data interface method includes differentially amplifying differential data signals based on a mode control signal indicating a first mode, and transmitting the amplified differential data signals to a receiving semiconductor device via a first transmission line and a second transmission line. The interface method also includes driving one of the differential data signals and a strobe signal to the first transmission line and the second transmission line, respectively, based on the mode control signal indicating a second mode, for transmitting the one of the differential data signals and the strobe signal to the receiving semiconductor device.

According to other embodiments of the present invention, a data interface method includes sampling differential data signals received from a transmitting semiconductor device according to differential signaling, in response to a controlled sampling clock signal based on a mode control signal indicating a first mode; and sampling one of the differential data signals, received from the transmitting semiconductor device, in response to a strobe signal, received from the transmitting semiconductor device, based on the mode control signal indicating a second mode. The controlled sampling clock signal is generated based on an internal clock signal and the differential data signals received from the transmitting semiconductor device.

According to yet other embodiments of the present invention, a data interface method includes transmitting differential data signals using differential signaling, or one of the differential data signals and a strobe signal using single ended signaling, from a transmitting semiconductor device to a receiving semiconductor device based on a mode control signal, and transmitting the mode control signal from the transmitting semiconductor device to the receiving semiconductor device. The differential data signals are sampled in response to a controlled sampling clock signal based on the mode control signal transmitted from the transmitting semiconductor device, or the one of the differential data signals transmitted from the transmitting semiconductor device is sampled in response to the strobe signal. The controlled sampling clock signal is generated based on an internal clock signal and the differential data signals transmitted from the transmitting semiconductor device.

BRIEF DESCRIPTION OF THE DRAWINGS

The embodiments of the present invention will be described with reference to the attached drawings, in which.

DETAILED DESCRIPTION OF THE EMBODIMENTS

The present invention will now be described more fully hereinafter with reference to the accompanying drawings, in which exemplary embodiments of the invention are shown. The invention may, however, be embodied in various different forms, and should not be construed as being limited only to the illustrated embodiments. Rather, these embodiments are provided as examples, to convey the concept of the invention to one skilled in the art. Accordingly, known processes, elements, and techniques are not described with respect to some of the embodiments of the present invention. Throughout the drawings, the sizes and relative sizes of elements and regions may be exaggerated for clarity. Also, throughout the drawings and written description, like reference numerals will be used to refer to like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc., may be used herein to describe various elements, these elements should not be limited by these terms. These terms are only used to distinguish one element from another. For example, a first signal could be termed a second signal, and similarly, a second signal could be termed a first signal, without departing from the teachings of the disclosure.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," or "includes" and/or "including," specify the presence of stated features, regions, integers, steps, operations, elements and/or components, but do not preclude the presence or addition of one or more other features, regions, integers, steps, operations, elements, components and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having meanings that are consistent with their meanings in the context of the relevant art and/or the present application, and will not be interpreted in an idealized or overly formal sense, unless expressly so defined herein.

Figure 1:
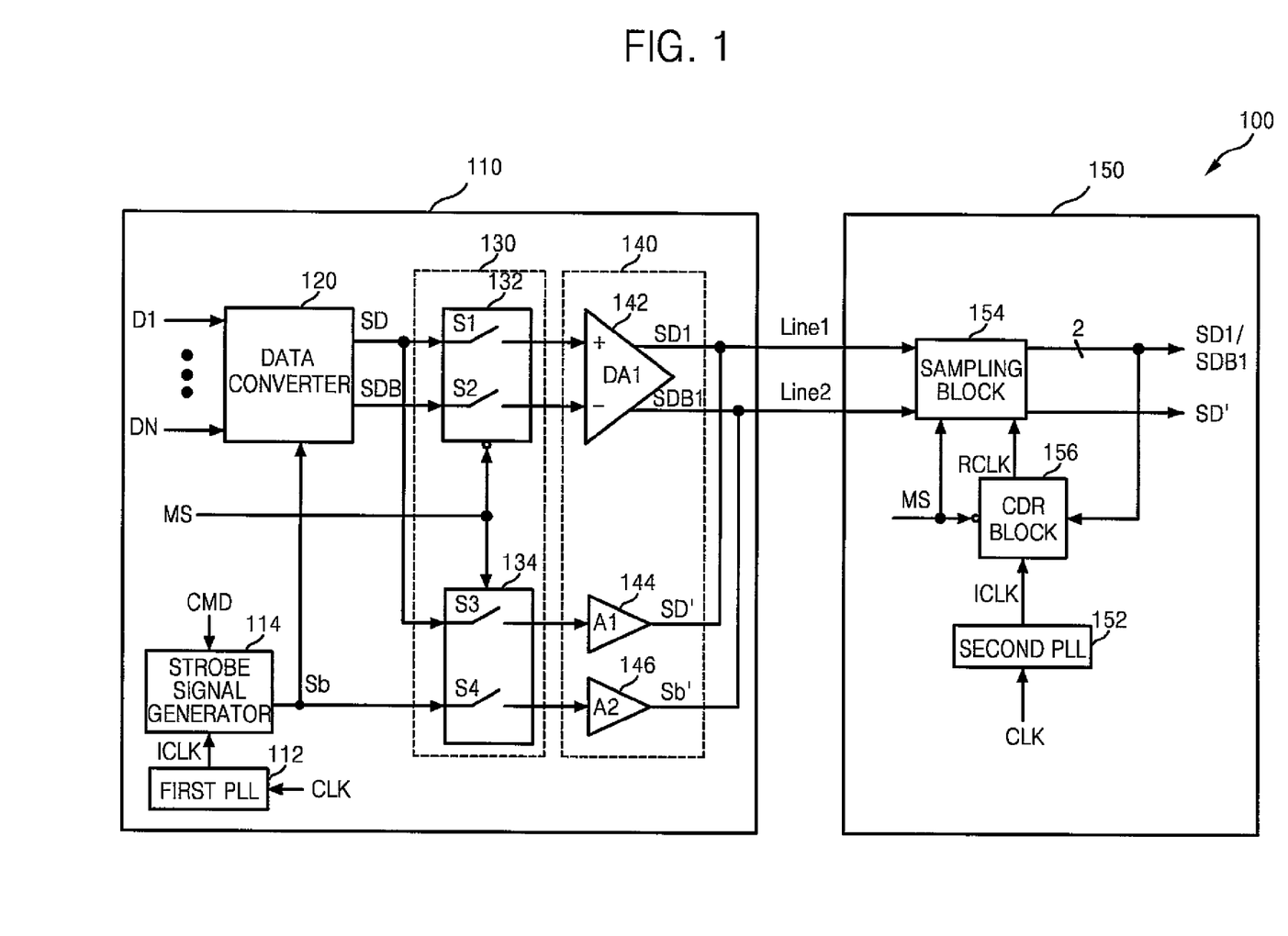
FIG. 1 is a block diagram illustrating an interface system, according to exemplary embodiments of the present invention.

FIG. 1 is a block diagram illustrating an interface system 100, according to illustrative embodiments of the present invention. Referring to FIG. 1, the interface system 100 includes a first semiconductor device 110, a second semiconductor device 150, and transmission media, indicated as transmission lines Line1 and Line2. Although only a pair of transmission lines Line1 and Line2 is illustrated for a single channel for data transmission between the first semiconductor device 110 and the second semiconductor device 150 in FIG. 1, it is understood that multiple channels, e.g., for additional semiconductor devices (not shown) may be included in the interface system 100.

The first semiconductor device 110 includes a first phase locked loop (PLL) 112, a strobe signal generator 114, a data converter 120, a switching block 130 and an amplification block 140. The first PLL 112 generates an internal clock signal ICLK locked to a clock signal CLK. The strobe signal generator 114 generates a strobe signal Sb based on the internal clock signal ICLK and a predetermined command CMD (e.g., a write command). The data converter 120 converts multiple parallel data signals, D1 through DN (where N is a natural number), into serial data signals, differential data signals SD and SDB. The differential data signals SD and SDB may have the same magnitude, but may have opposite phases, for example.

The switching block 130 receives the differential data signals SD and SDB and the strobe signal Sb. The switching block 130 outputs the differential data signals SD and SDB, or one data signal (e.g., SD) of the differential data signals SD and SDB, and the strobe signal Sb, based on a mode control signal MS. The switching block 130 includes multiple switched, represented as switches S1 through S4. The switches S1 through S4 respectively switch the differential data signals SD and SDB to the amplification block 140, or switch one of the differential data signals SD or SDB and the strobe signal Sb to the amplification block 140, in response to the mode control signal MS.

More particularly, when the mode control signal MS is at a first level, e.g., a low logic level (which is referred to as a "first mode"), the first switch S1 and the second switch S2 are turned ON and the third switch S3 and the fourth switch S4 are turned OFF, so that the differential data signals SD and SDB are output to the amplification block 140. When the mode control signal MS is at a second level, e.g., a high logic level (which is referred to as a "second mode"), the third and fourth switches S3 and S4 are turned ON and the first and second switches S1 and S2 are turned OFF, so that one data signal (e.g., SD) of the differential data signals SD and SDB, and the strobe signal Sb are output to the amplification block 140.

In various embodiments, the first and second switches S1 and S2 may be implemented as PMOS transistors and the third and fourth switches S3 and S4 may be implemented as NMOS transistors, for example. Also, the first and second levels may include different logic levels, depending on the configuration of the various components of the semiconductor devices 110 and 150.

In the first mode, the amplification block 140 differentially amplifies the differential data signals SD and SDB received from the switching block 130, and transmits amplified differential data signals SD1 and SDB1 to the second semiconductor device 150 via the transmission lines Line1 and Line2. In the second mode, the amplification block 140 individually amplifies the one data signal (e.g., SD) and the strobe signal Sb, which are received from the switching block 130, and transmits an amplified data signal SD' and an amplified strobe signal Sb' to the second semiconductor device 150 via the transmission lines Line1 and Line2.

Accordingly, the amplification block 140 includes a differential amplifier 142, a first driver 144 and a second driver 146. The differential amplifier 142 includes a first input terminal (e.g., a positive input terminal) connected to the first switch S1 and a second input terminal (e.g., a negative input terminal) connected to the second switch S2.

The differential amplifier 142 differentially amplifies the differential data signals SD and SDB received from the switching block 130, and then transmits the amplified differential data signals SD1 and SDB1 to the second semiconductor device 150 via the transmission lines Line1 and Line2.

The first driver 144 is connected to the third switch S3 and the second driver 146 is connected to the fourth switch S4. The first driver 144 drives the one (e.g., SD) of the differential data signals SD and SDB received through the switching operation of the third switch S3 to the first transmission line Line1. The second driver 146 drives the strobe signal Sb received through the switching operation of the fourth switch S4 to the second transmission line Line2.

The mode control signal MS, which may be received from a controller (not shown), determines a data transmission method of the first semiconductor device 110. When the mode control signal MS is at the low logic level, that is, in the first mode, the first semiconductor device 110 may transmit the differential data signals SD and SDB to the second semiconductor device 150 using differential signaling. When the mode control signal MS is at the high logic level, that is, in the second mode, the first semiconductor device 110 may transmit the one data signal (e.g., SD) and the strobe signal Sb to the second semiconductor device 150 using single ended signaling.

The second semiconductor device 150 includes a second PLL 152, a sampling block 154 and a clock and data recovery (CDR) block 156. The second PLL 152 generates an internal clock signal ICLK locked to the clock signal CLK. The first PLL 112 and the second PLL 152 may be implemented by delay locked loops (DLLs), for example.

The sampling block 154 is configured to sample the differential data signals SD1 and SDB1, received via the transmission lines Line1 and Line2 from the first semiconductor 110, in response to a controlled sampling clock signal RCLK based on the mode control signal MS. In addition, the sampling block 154 is configured to sample the data signal (e.g., SD') transmitted via the first transmission line Line1 from the first semiconductor device 110 in response to the strobe signal Sb' transmitted via the second transmission line Line2 from the first semiconductor device 110, based on the mode control signal MS.

Figure 2:
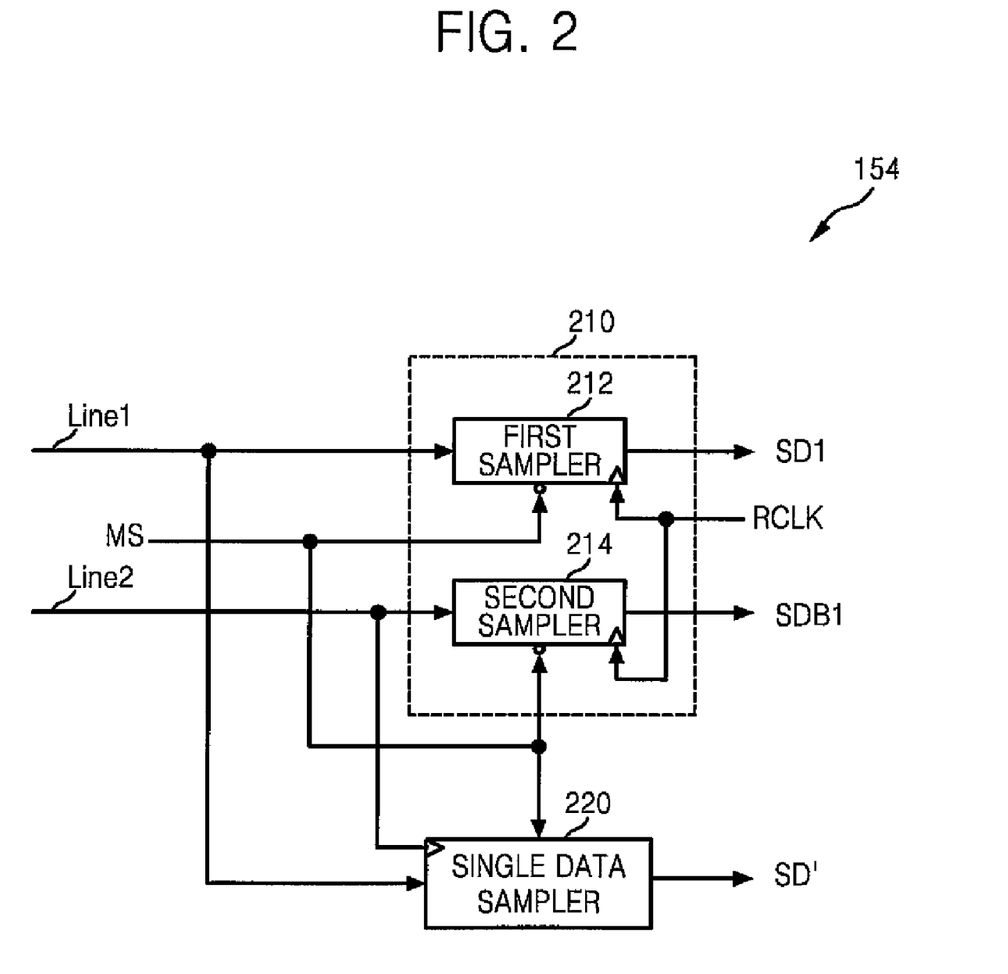
FIG. 2 is a block diagram illustrating a sampling block of FIG. 1, according to exemplary embodiments of the present invention.

FIG. 2 is a block diagram illustrating the sampling block 154 depicted in FIG. 1, according to illustrative embodiments of the present invention. The sampling block 154 includes a differential data sampler 210 and a single data sampler 220. The differential data sampler 210 includes a first sampler 212 and a second sampler 214.

When the mode control signal MS is at the low logic level, that is, in the first mode, the first sampler 212 and the second sampler 214 are enabled. The first sampler 212 may sample the differential data signal SD1, which is transmitted via the first transmission line Line1, in response to the controlled sampling clock signal RCLK. Similarly, the second sampler 214 may sample the differential data signal SDB1, which is transmitted via the second transmission line Line2, in response to the controlled sampling clock signal RCLK.

When the mode control signal MS is at the high logic level, that is, in the second mode, the single data sampler 220 is enabled. The single data sampler 220 may sample the data signal SD', which is transmitted via the first transmission line Line1, in response to the strobe signal Sb', which is transmitted via the second transmission line Line2.

Referring again to FIG. 1, the CDR block 156 is enabled based on the mode control signal MS and generates the controlled sampling clock signal RCLK from the differential data signals SD1 and SDB1, which are transmitted via the first and second transmission lines Line1 and Line2. For instance, when the mode control signal MS is at the low logic level, that is, in the first mode, the CDR block 156 is turned ON, and may sample each of the differential data signals SD1 and SDB1, e.g., more than two times during a single signal cycle using oversampling. The CDR block 156 then generates the controlled sampling clock signal RCLK using information about values of the sampled data signals. Accordingly, the interface system 100 illustrated in FIG. 1 can perform high-speed data transmission according to the differential signaling in the first mode. When the mode control signal MS is at the high logic level, that is, in the second mode, the CDR block 156 in the interface system 100 is not turned ON, according to the single ended signaling in the second mode, thereby reducing power consumption.

Figure 3:
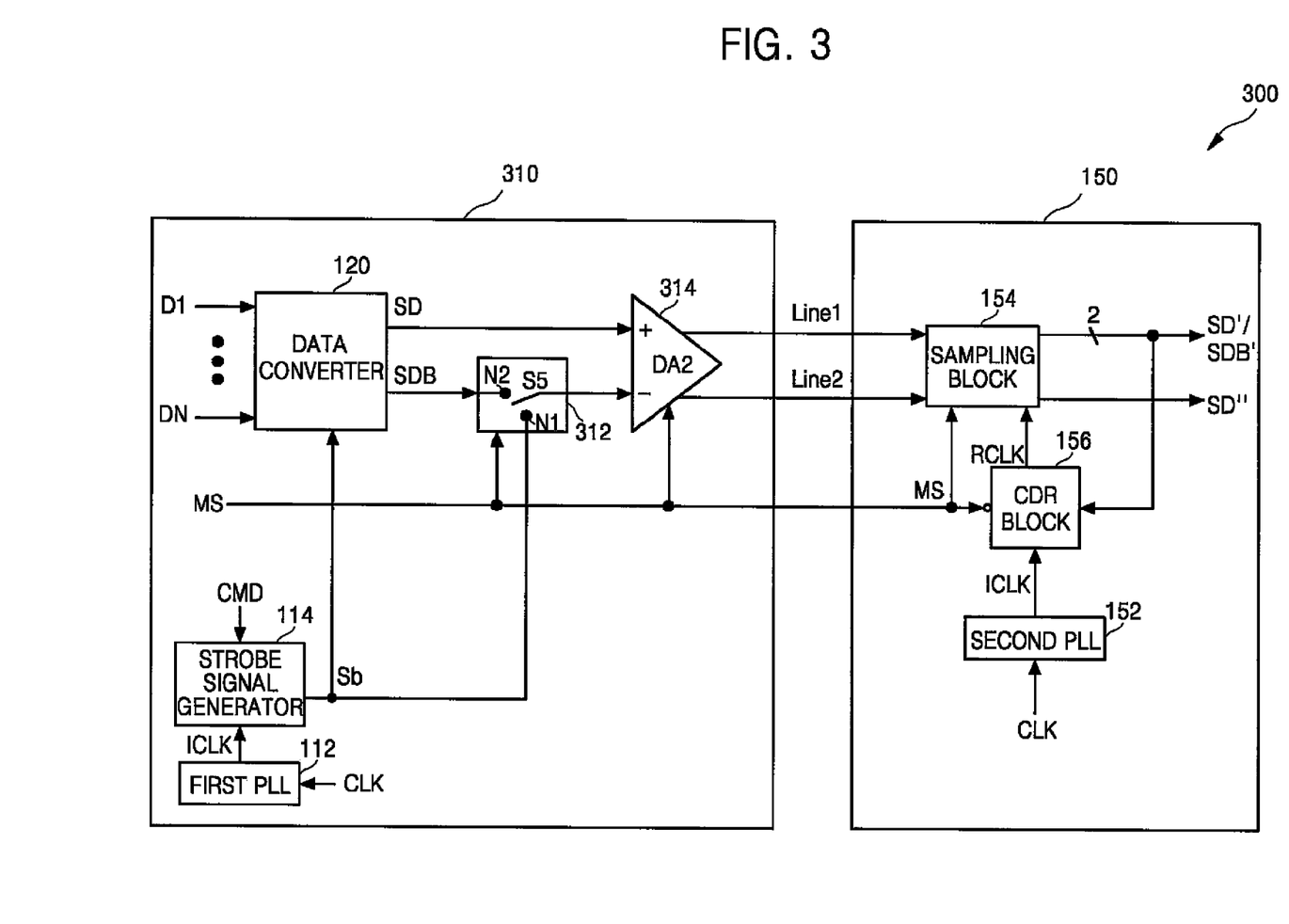
FIG. 3 is a block diagram illustrating an interface system, according to exemplary embodiments of the present invention.

FIG. 3 is a block diagram illustrating an interface system 300, according to other illustrative embodiments of the present invention. Referring to FIG. 3, the interface system 300 includes the second semiconductor device 150, e.g., as illustrated in FIG. 1, and a third semiconductor device 310.

The third semiconductor device 310 includes the first PLL 112, the strobe signal generator 114, the data converter 120, a switching block 312, and an amplification block 314. The PLL 112, the strobe signal generator 114 and the data converter 120 may be essentially the same as those illustrated in FIG. 1. However, the strobe signal generator 114 illustrated in FIG. 3 outputs the strobe signal Sb to a first node N1 of the switching block 312, and the data converter 120 outputs one differential data signal (e.g., SD) of the differential data signals SD and SDB to a positive input terminal of the amplification block 314 and the other differential data signal (e.g., SDB) to a second node N2 of the switching block 312.

As illustrated in FIG. 3, the switching block 312 includes a fifth switch S5. When the mode control signal MS is at the low logic level, that is, in the first mode, the fifth switch S5 connects a negative input terminal of the amplification block 314 with the second node N2. When the mode control signal MS is at the high logic level, that is, in the second mode, the fifth switch S5 connects the negative input terminal of the amplification block 314 with the first node N1.

Therefore, when the mode control signal MS is at the low logic level, that is, in the first mode, the amplification block 314 may differentially amplify one differential data signal (e.g., SD) input from the data converter 120 and the other differential data signal (e.g., SDB) input from the switching block 312. When the mode control signal MS is at the high logic level, that is, in the second mode, the amplification block 314 may individually amplify one differential data signal (e.g., SD) input from the data converter 120 and the strobe signal Sb input from the switching block 312. In each mode, the amplification block 314 sends the amplified signals to the second semiconductor device 150 via the transmission lines Line1 and Line2.

Figure 4:
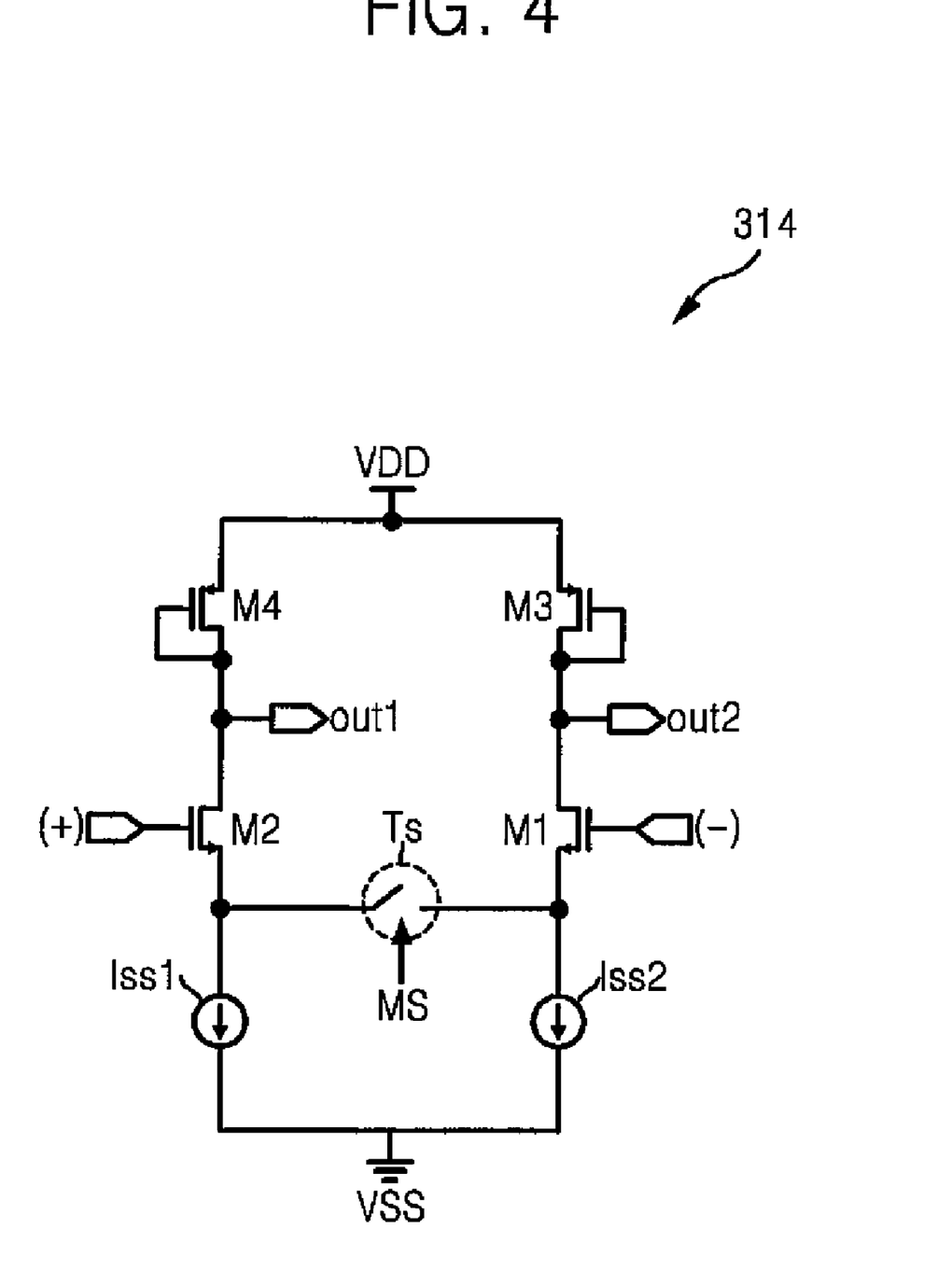
FIG. 4 is a circuit diagram illustrating an amplification block of FIG. 3, according to exemplary embodiments of the present invention.

FIG. 4 is a circuit diagram illustrating the amplification block 314 of FIG. 3, according to illustrative embodiments of the present invention. Referring to FIG. 4, the amplification block 314 may be fundamentally implemented by a differential amplifier. For example, the amplification block 314 may include a pair of differential transistors M1 and M2, load transistors M3 and M4, current sources Iss1 and Iss2, and a tail switch Ts.

The tail switch Ts is turned ON or OFF in response to the mode control signal MS received by the amplification block 314. When the mode control signal MS is at the low logic level, that is, in the first mode, the tail switch Ts is turned ON and the amplification block 314 may serve as a differential amplifier. In contrast, when the mode control signal MS is at the high logic level, that is, in the second mode, the tail switch Ts is turned OFF and the amplification block 314 may individually amplify input signals (e.g., the differential data signal SD and the strobe signals Sb).

Figure 5:
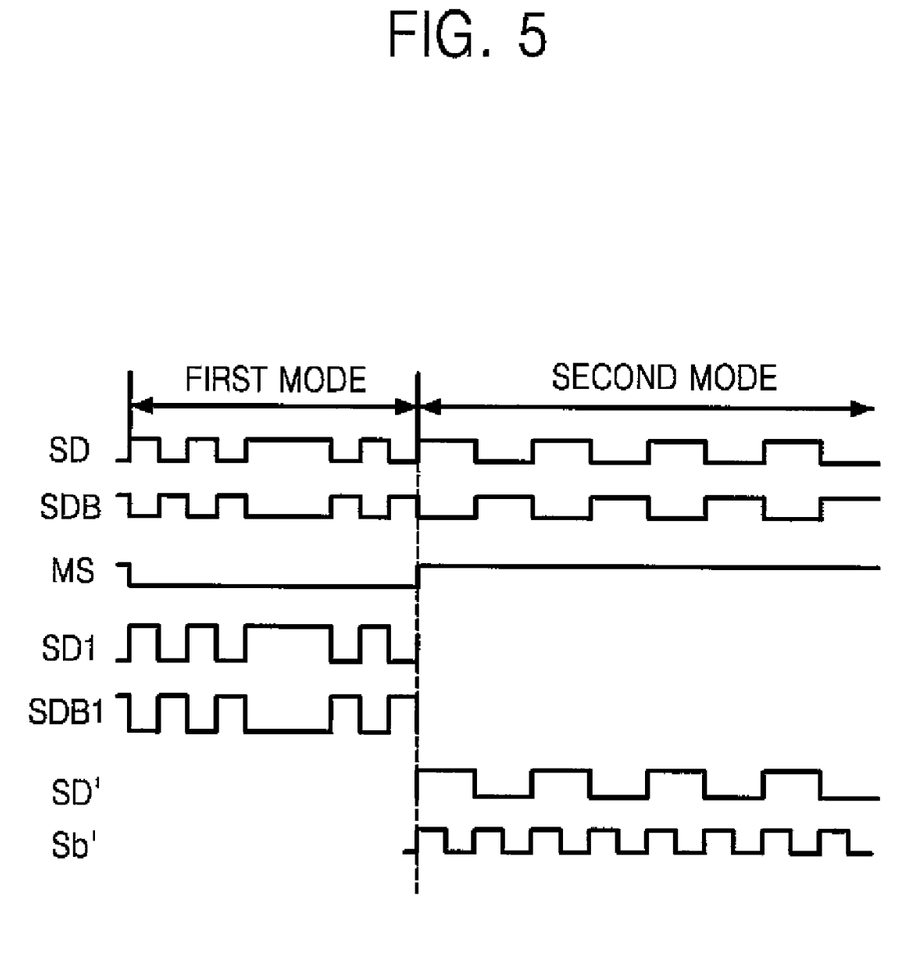
FIG. 5 is a timing chart of the interface system illustrated in FIG. 1, according to exemplary embodiments of the present invention.

FIG. 5 is a timing chart of the illustrative interface system 100 depicted in FIG. 1. It is understood that the first mode is a high-speed data transmission mode and the second mode is a low-speed data transmission mode.

Referring to FIGS. 1 and 5, the mode control signal MS is at the low logic level in the first mode and at the high logic level in the second mode, in the depicted example. In the first mode, the amplified differential data signals SD1 and SDB1 are transmitted from the differential amplifier 142. In the second mode, one data signal (e.g., SD') driven by the first driver 144 and the strobe signal Sb' driven by the second driver 146 are transmitted.

Figure 6:
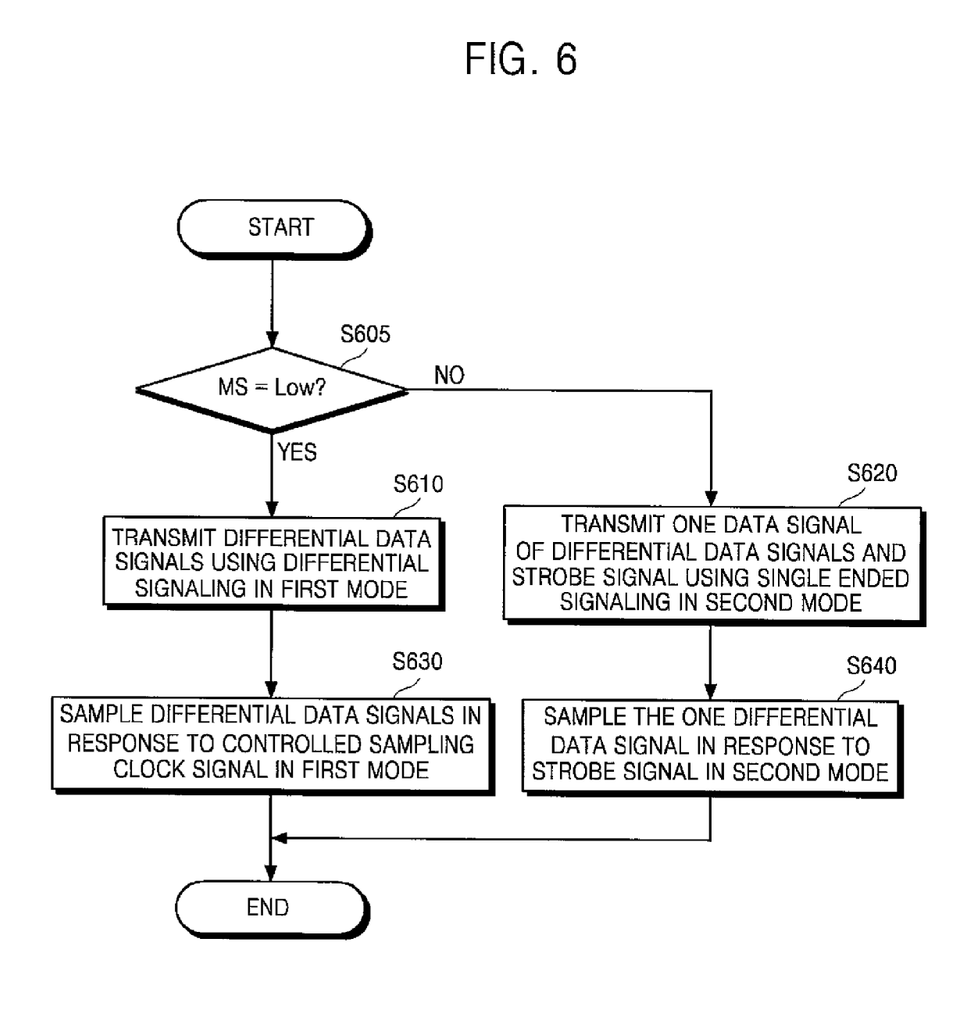
FIG. 6 is a flowchart of a data interface method, according to exemplary embodiments of the present invention.

FIG. 6 is a flowchart of a data interface method, according to illustrative embodiments of the present invention. Referring to FIG. 6, in operation S605, it is determined whether the mode control signal MS indicates a first or second mode, depending on the logic level of the mode control signal MS. For example, when the mode control signal MS is at the low logic level (S605: Yes), the process proceeds to operation S610 according to the first mode. When the mode control signal MS is not at the low logic level, e.g., it is at the high logic level (S605: No), the process proceeds to operation S620 according to the second mode.

In operation S610, a transmitting semiconductor device transmits differential data signals to a receiving semiconductor device using differential signaling in the first mode. In particular, the transmitting semiconductor device may differentially amplify the differential data signals based on the mode control signal MS, and then transmit the amplified differential data signals to the receiving semiconductor device via a first transmission line and a second transmission line.

In operation S620, the transmitting semiconductor device transmits one of the differential data signals and a strobe signal to the receiving semiconductor device using single ended signaling in the second mode. In particular, the transmitting semiconductor device may drive one of the differential data signals and the strobe signal to the first transmission line and the second transmission line, respectively, based on the mode control signal.

As discussed above, the strobe signal may be generated based on an internal clock signal and a predetermined command. The differential data signals may be serial data signals, which have been converted from multiple parallel data signals in response to strobe signals.

In operation S630, the receiving semiconductor device samples the differential data signals, which are transmitted from the transmitting semiconductor device according to the differential signaling, in response to a controlled sampling clock signal in the first mode. The controlled sampling clock signal may be generated based on an internal clock signal and the differential data signals transmitted from the transmitting semiconductor device.

In operation S640, the receiving semiconductor device samples one differential data signal, which is transmitted from the transmitting semiconductor device, in response to the strobe signal, which is also transmitted from the transmitting semiconductor device according to the single ended signaling, in the second mode.

Either the first mode or the second mode is set based on the mode control signal MS. Also, operations S630 and S640 may be complementarily performed based on the mode control signal MS. The mode control signal MS may be input to the transmitting semiconductor device and to the receiving semiconductor device from a timing controller (not shown). Alternatively, the mode control signal MS may be input to the transmitting semiconductor device from the timing controller and then transmitted by the transmitting semiconductor device to the receiving semiconductor device.

FIGS. 1 and 3 show examples of data interfaces through a single channel between two semiconductor devices. However, the present invention is not restricted to the depicted exemplary embodiments, but may be applied to channels between multiple semiconductor devices and one semiconductor device, for example.

Figure 7:
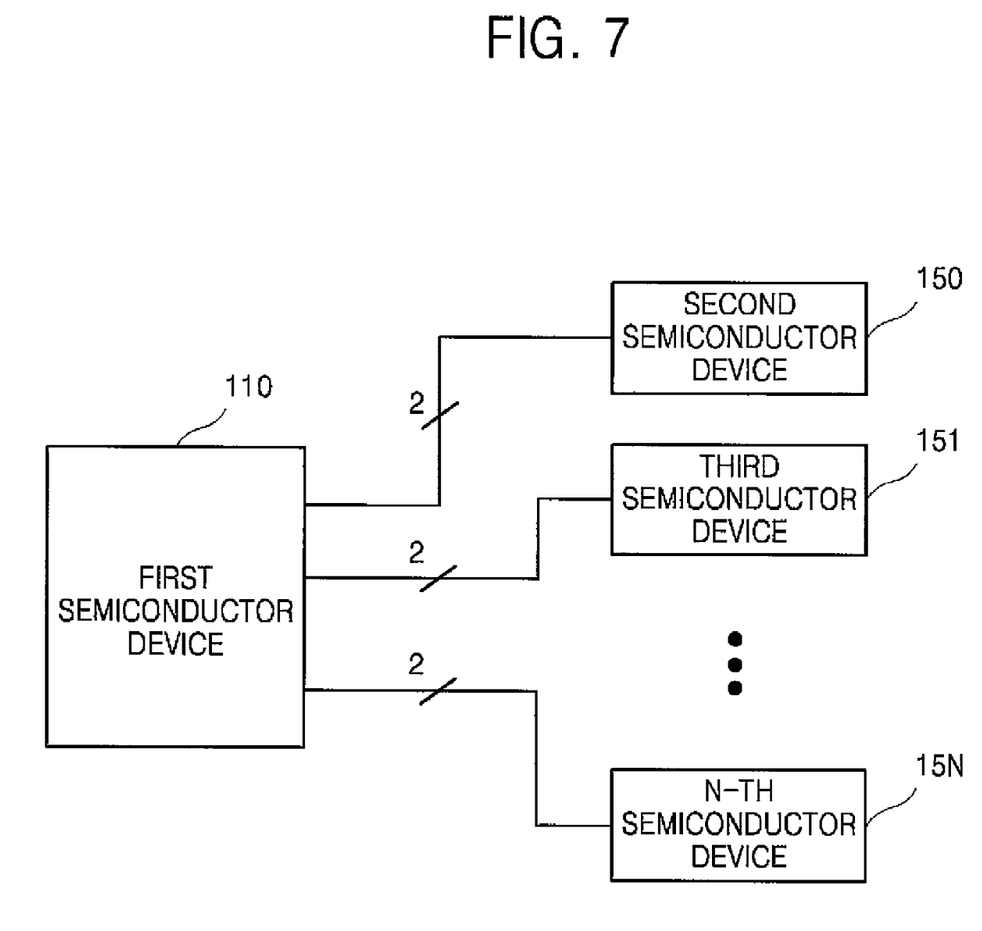
FIG. 7 is a block diagram illustrating an interface among semiconductor devices, according to exemplary embodiments of the present invention.

FIG. 7 is a block diagram showing interfaces among multiple semiconductor devices, according to illustrative embodiments of the present invention. Referring to FIG. 7, an interface between the first semiconductor device 110 and the second semiconductor device 150 may be the same as that illustrated and discussed above with respect to FIG. 1 or 3. Likewise, the interfaces between the first semiconductor device 110 and each of multiple semiconductor devices 151 through 15N (where N is a natural number) may be the same as that illustrated in FIG. 1 or 3. Accordingly, the first semiconductor device 110 may independently select the first mode (e.g., differential signaling) or the second mode (e.g., single ended signaling) for the interface with each of the semiconductor devices 150 through 15N.

As described above, according to various illustrative embodiments of the present invention, an interface system can perform high-speed data transmission using differential signaling. However, the interface system can disable a CDR block in a receiving semiconductor device using single ended signaling, according to which a strobe signal is transmitted, during low-speed data transmission, thereby reducing power consumption.

While the present invention has been described with reference to exemplary embodiments, it will be apparent by those skilled in the art that various changes and modifications may be made without departing from the spirit and scope of the present invention. Therefore, it should be understood that the above embodiments are not limiting, but illustrative.

What is claimed is:

1. A semiconductor device, comprising:
    a signal switch configured to receive differential data signals and a strobe signal, and to output either the differential data signals or one of the differential data signals and the strobe signal, based on a mode control signal; and
    a signal amplifier configured to differentially amplify the differential data signals output from the signal amplify the one of the differential data signals and the strobe signal output from the signal switch, and to transmit the amplified signals to a receiving semiconductor device via a plurality of transmission lines,
    wherein the signal amplifier comprises a differential amplifier configured to differentially amplify the differential data signals, which are received from the signal switch based on the mode control signal, and to individually amplify the one of the differential data signals and the strobe signal, which are received from the signal switch based on the mode control signal.

2. The semiconductor device of claim 1, further comprising:
    a data converter configured to convert a plurality of parallel data signals into serial data signals in response to the strobe signal, the serial data signals comprising the differential data signals.

3. The semiconductor device of claim 1, further comprising:
a strobe signal generator configured to generate the strobe signal based on an internal clock signal and a predetermined command.

4. The semiconductor device of claim 1, wherein the semiconductor device transmits the mode control signal to the receiving semiconductor device.

5. A receiving semiconductor device comprising:
a sampler configured to sample the differential data signals received from the semiconductor device of claim 1 in response to a controlled sampling clock signal based on the mode control signal, or to sample the one of the differential data signals that is received from the semiconductor device of claim 1 in response to the strobe signal from the semiconductor device of claim 1 based on the mode control signal; and
a clock and data recovery (CDR) unit configured to generate the controlled sampling clock signal from the differential data signals based on the mode control signal.

6. The semiconductor device of claim 5, wherein the sampler comprises:
a differential data sampler configured to be enabled based on the mode control signal and to individually sample the differential data signals in response to the controlled sampling clock signal; and
a single data sampler configured to be enabled based on the mode control signal and to sample the one of the differential data signals in response to the strobe signal.

7. The semiconductor device of claim 6, wherein the differential data sampler and the single data sampler are complementarily enabled based on the mode control signal.

8. An interface system comprising the semiconductor device of claim 1, a receiving semiconductor device and a plurality of transmission lines connected between the semiconductor device of claim 1 and the receiving semiconductor device, wherein the receiving semiconductor device comprises:
a sampler configured to sample the differential data signals received from the semiconductor device of claim 1 in response to a controlled sampling clock signal based on the mode control signal, or to sample the one of the differential data signals that is received from the semiconductor device of claim 1 in response to the strobe signal from the semiconductor device of claim 1 based on the mode control signal; and
a clock and data recovery (CDR) unit configured to generate the controlled sampling clock signal from the differential data signals based on the mode control signal, and
wherein the transmission lines are configured to transmit the mode control signal, the differential data signals and the strobe signal.

9. A data interface method, comprising:
connecting first and second input terminals of an amplifier to differential data signals and differentially amplifying the differential data signals based on a mode control signal indicating a first mode, and transmitting the amplified differential data signals to a receiving semiconductor device via a first transmission line and a second transmission line; and
connecting the first input terminal of the amplifier to one of the differential data signals and the second input terminal of the amplifier to a strobe signal and individually amplifying the one of the differential data signals and the strobe signal based on the mode control signal indicating a second mode, and transmitting the one of the differential data signals and the strobe signal to the receiving semiconductor device via the first transmission line and the second transmission line, respectively.

10. The data interface method of claim 9, further comprising:
converting a plurality of parallel data signals into serial data signals in response to the strobe signal, the serial data signals comprising the differential data signals.

11. The data interface method of claim 9, further comprising:
generating the strobe signal based on an internal clock signal and a predetermined command.

12. A data interface method, comprising:
connecting first and second input terminals of an amplifier in a transmitting semiconductor device to differential data signals, and differentially amplifying the differential data signals, when a mode control signal indicates a first mode;
connecting the first input terminal of the amplifier to one of the differential data signals and the second input terminal of the amplifier to a strobe signal, and individually amplifying the one of the differential data signals and the strobe signal, when the mode control signal indicates a second mode;
transmitting the amplified differential data signals using differential signaling, or the amplified one of the differential data signals and the strobe signal using single ended signaling, from the transmitting semiconductor device to a receiving semiconductor device based on the mode control signal;
transmitting the mode control signal from the transmitting semiconductor device to the receiving semiconductor device; and
sampling the differential data signals in response to a controlled sampling clock signal based on the mode control signal transmitted from the transmitting semiconductor device, or sampling the one of the differential data signals transmitted from the transmitting semiconductor device in response to the strobe signal,
wherein the controlled sampling clock signal is generated based on an internal clock signal and the differential data signals transmitted from the transmitting semiconductor device.

* * * * *